US009793995B2

(12) United States Patent
Lozhkin

(10) Patent No.: US 9,793,995 B2
(45) Date of Patent: Oct. 17, 2017

(54) COMMUNICATION DEVICE THAT TRANSMITS SIGNALS VIA A PLURALITY OF ANTENNAS AND COMMUNICATION SYSTEM

(71) Applicant: FUJITSU LIMITED, Kawasaki-shi, Kanagawa (JP)

(72) Inventor: Alexander Nikolaevich Lozhkin, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/180,676

(22) Filed: Jun. 13, 2016

(65) Prior Publication Data
US 2017/0093495 A1   Mar. 30, 2017

(30) Foreign Application Priority Data

Sep. 28, 2015 (JP) ................................ 2015-190356

(51) Int. Cl.
H04B 10/2575 (2013.01)
H04L 27/00 (2006.01)
H04J 14/08 (2006.01)

(52) U.S. Cl.
CPC . *H04B 10/25753* (2013.01); *H04B 10/25759* (2013.01); *H04J 14/08* (2013.01); *H04L 27/00* (2013.01)

(58) Field of Classification Search
CPC .. H04B 10/25753–10/25755; H04B 10/25759; H04L 27/00; H04J 14/08
See application file for complete search history.

(56) References Cited

U.S. PATENT DOCUMENTS

| 2006/0079290 A1* | 4/2006 | Seto ..................... H01Q 3/2605 455/562.1 |
| 2008/0063397 A1 | 3/2008 | Hu et al. |
| 2011/0026923 A1 | 2/2011 | Kim et al. |

FOREIGN PATENT DOCUMENTS

| JP | 2002-354534 | 12/2002 |
| JP | 2008-072714 | 3/2008 |

(Continued)

OTHER PUBLICATIONS

Hwan Seok Chung et al., "Design of RoF based Mobile Fronthaul Link with Multi-IF Carrier for LTE/LTE-A Signal Transmission," IEEE MWP/APMW (2014), Sapporo, Japan, pp. 501-504 (4 pages).

(Continued)

*Primary Examiner* — Leslie Pascal
(74) *Attorney, Agent, or Firm* — Fujitsu Patent Center

(57) ABSTRACT

A communication device includes: a converter circuit configured to convert an optical signal that carries an oscillator signal of a radio frequency and transmission signals generated in a signal processing device into an electric signal; an extractor configured to extract the oscillator signal from the electric signal; a recovery circuit configured to recover the transmission signals from the electric signal; a radio frequency signal generator configured to generate radio frequency signals that respectively carry the transmission signals recovered by the recovery circuit using the oscillator signal; amplifiers respectively configured to amplify the radio frequency signals; antennas respectively configured to output the amplified radio frequency signals; a feedback circuit configured to generate a feedback signal from the amplified radio frequency signals; and a transmitter configured to convert the feedback signal into an optical signal and transmit it to the signal processing device.

11 Claims, 7 Drawing Sheets

(56) References Cited

FOREIGN PATENT DOCUMENTS

| JP | 2010-041470 | 2/2010 |
|----|-------------|--------|
| JP | 2010-507313 | 3/2010 |
| JP | 2014-103571 | 6/2014 |
| WO | 2008/047996 | 4/2008 |

OTHER PUBLICATIONS

Changyo Han et al., "Experimental Comparison of the Multi-IF Carrier Generation Methods in IF-over-Fiber System Using LTE Signals," MWP (2014), Sapporo, Japan, pp. 509-512 (4 pages).
Lei Ding et al., "A Robust Digital Baseband Predistorter Constructed Using Memory Polynomials," IEEE Transaction On Communications, vol. 52, No. 1, (Jan. 2004), pp. 159-165 (7 pages).

* cited by examiner

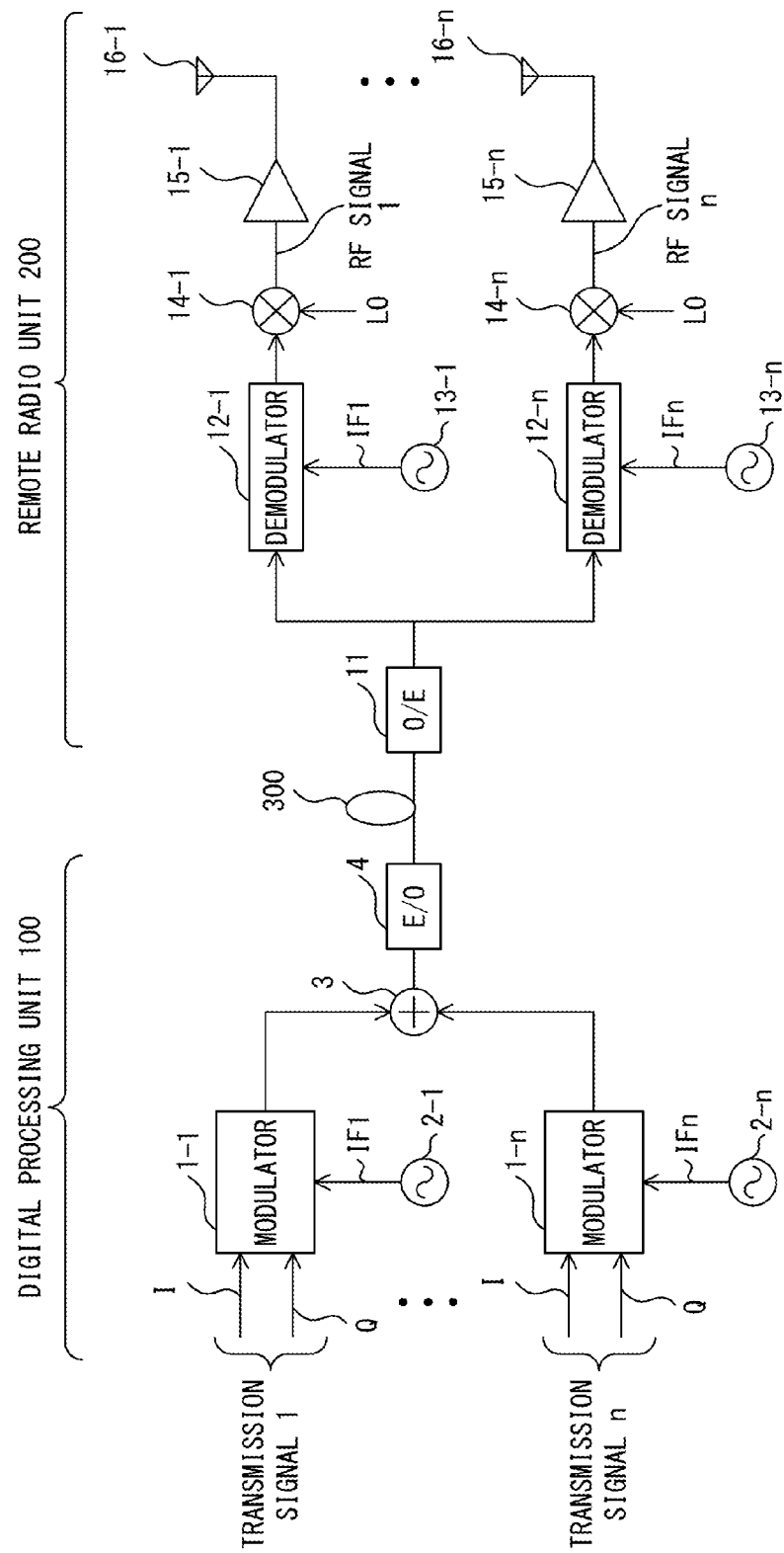
F I G. 1

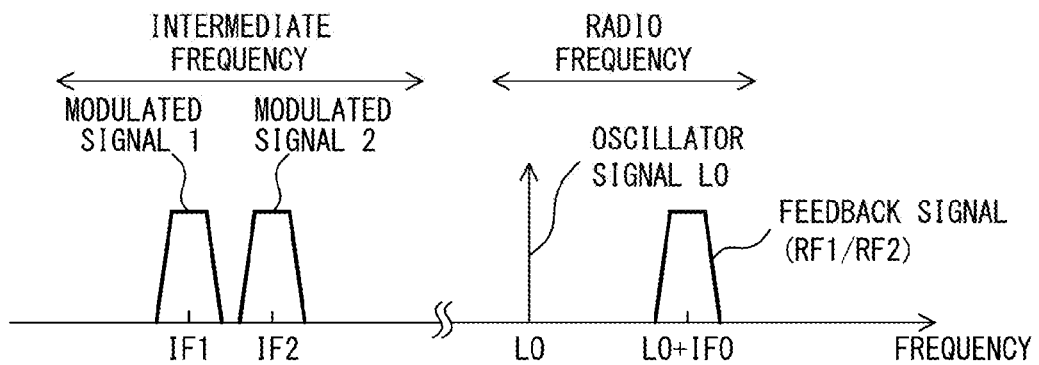
F I G. 3

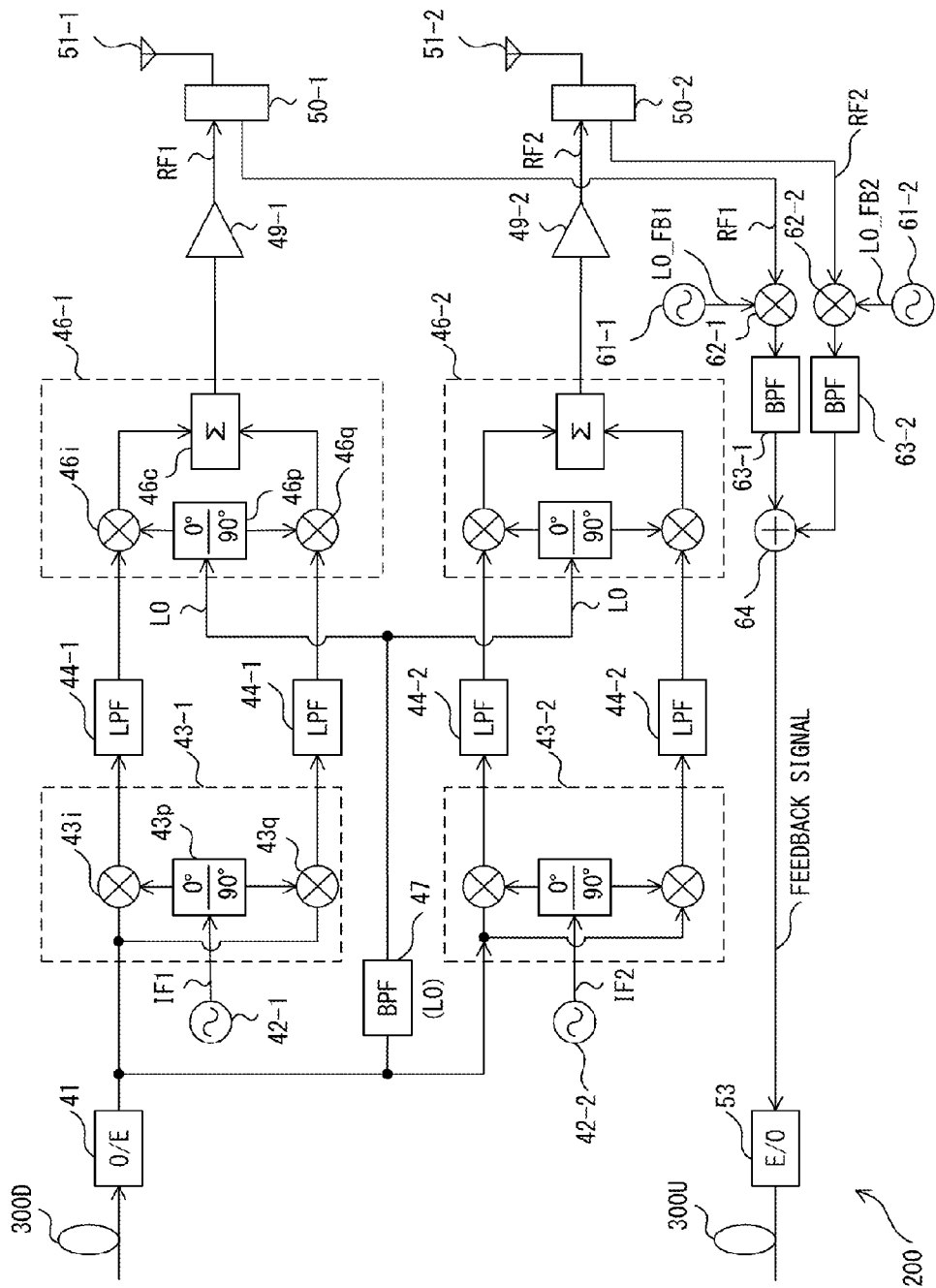
F I G. 7

COMMUNICATION DEVICE THAT TRANSMITS SIGNALS VIA A PLURALITY OF ANTENNAS AND COMMUNICATION SYSTEM

CROSS-REFERENCE TO RELATED APPLICATION

This application is based upon and claims the benefit of priority of the prior Japanese Patent Application No. 2015-190356, filed on Sep. 28, 2015, the entire contents of which are incorporated herein by reference.

FIELD

The embodiments discussed herein are related to a communication device that transmits a plurality of signals via a plurality of antennas and a communication system.

BACKGROUND

As a scheme to reduce the cost of configuring a radio communication system, a distributed antenna system (DAS) has been implemented. In the distributed antenna system, a signal processing device that processes a transmission signal and a radio device that outputs a radio signal are separated. In the following description, the signal processing device may be referred to as a "digital processing unit". The radio device may be referred to as a "remote radio unit (RRU)" or a "remote radio head (RRH)".

A transmission between a digital processing unit and a remote radio unit is implemented by, for example, Radio over Fiber (RoF). A radio frequency signal (RF signal) or an intermediate frequency signal (IF signal) is transmitted via an optical fiber in Radio over Fiber.

The digital processing unit generates an RF signal by, for example, up-converting a data signal. In this case, the digital processing unit converts the RF signal into an optical RF signal, and transmits the optical RF signal to the remote radio unit through an optical fiber. The remote radio unit converts the received optical RF signal into an electric signal and amplifies the electric signal. Then the remote radio unit transmits the amplified RF signal to a mobile station via an antenna.

In order to increase a transmission power of the RF signal to be transmitted to the mobile station via the antenna, the remote radio unit is equipped with a high-power amplifier that amplifies the RF signal. Here, the high-power amplifier may be controlled to operate near a saturation region so as to improve an amplification efficiency. Thus, a function to compensate for or suppress a distortion of an output signal of the amplifier is requested. As an example, a feedback signal that indicates the output signal of the amplifier is transmitted to the digital processing unit. Then the digital processing unit corrects a transmission signal so as to compensate for or suppress a distortion component of the output signal of the amplifier by using the feedback signal. As a result, the remote radio unit can output a signal in which a distortion is suppressed. Note that this function may be referred to as predistortion. A circuit that performs predistortion may be referred to as a predistorter.

In the above described system, the signal processing (including predistortion) is performed in the digital processing unit. Thus, the configuration of the remote radio unit can be simplified. As a result, the total cost for implementing a communication system may be greatly reduced especially in a configuration in which a plurality of remote radio units are connected to the digital processing unit.

Note that a transmission system in which a predistorter and a power amplifier are separately located is described in, for example, Japanese Laid-open Patent Publication No. 2014-103571. In addition, the related technologies are described in documents 1-3 below.

Document 1: H. S. Chung et al, "Design of RoF based Mobile Fronthaul Link with Multi-IF Carrier for LTE/LTE-A Signal Transmission," IEEE MWP/APMW 2014, Sapporo, Japan.

Document 2: Changyo Han, Seung-Hyun Cho, Hwan Seok Chung, Sang Soo Lee and Jonghyun Lee, "Experimental Comparison of the Multi-IF Carrier Generation Methods in IF-over-Fiber System Using LTE Signals," MWP 2014, Sapporo, Japan.

Document 3: Lei Ding et al., "A Robust Digital Baseband Predistorter Constructed Using Memory Polynomials," IEEE Transaction on Communications, Vol. 52, No 1, January 2004.

In order to increase a capacity of a wireless link, a multi-antenna system that transmits a plurality of radio signals using a plurality of antennas is implemented. As an example of the multi-antenna system, a plurality of radio signals are transmitted from a plurality of transmitting antennas and received by a plurality of receiving antennas in a MIMO (Multi-Input Multi-Output) system.

In addition, a remote radio unit equipped with a plurality of transmitting antennas is proposed. In this distributed system, a plurality of signals are transmitted from the digital processing unit to the remote radio unit through an optical fiber. The remote radio unit respectively amplifies the signals and then outputs the amplified signals. However, a method to efficiently perform predistortion for the plurality of amplified signals in the distributed system is not known. Note that since a plurality of optical fibers are necessary to transmit a plurality of feedback signals that respectively indicate output signals of the plurality of amplifiers from the remote radio unit to the digital processing unit, a cost for configuring a communication system may increase.

SUMMARY

According to an aspect of the embodiments, a communication device includes: a converter circuit configured to convert an optical signal that carries an oscillator signal of a radio frequency and a plurality of transmission signals generated in a signal processing device into an electric signal; an extractor configured to extract the oscillator signal from the electric signal; a recovery circuit configured to recover the plurality of transmission signals from the electric signal; a radio frequency signal generator configured to generate a plurality of radio frequency signals that respectively carry the plurality of transmission signals recovered by the recovery circuit using the oscillator signal extracted by the extractor; a plurality of amplifiers respectively configured to amplify the plurality of radio frequency signals; a plurality of antennas respectively configured to output the plurality of radio frequency signals amplified by the plurality of amplifiers; a feedback circuit configured to generate a feedback signal from the plurality of radio frequency signals amplified by the plurality of amplifiers; and a transmitter configured to convert the feedback signal into an optical signal and transmit the optical signal to the signal processing device.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 illustrates an example of a communication system with Radio over Fiber.

FIG. 3 illustrates an example of a frequency allocation of an optical signal transmitted between the digital processing unit and a remote radio unit.

FIG. 7 illustrates an example of the remote radio unit according to the second embodiment.

DESCRIPTION OF EMBODIMENTS

Figure 2:
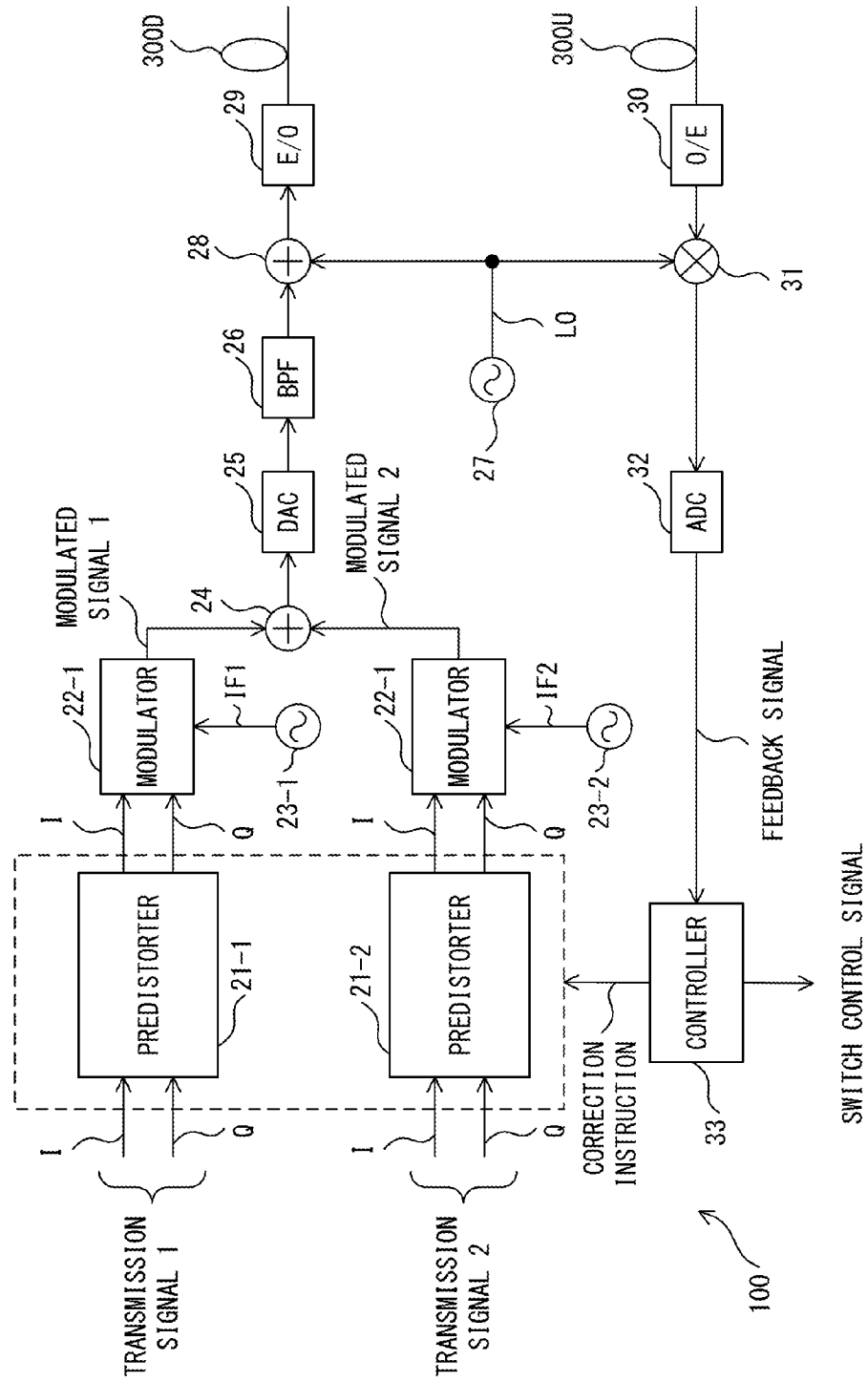
FIG. 2 illustrates an example of a digital processing unit according to a first embodiment.

FIG. 1 illustrates an example of a communication system with Radio over Fiber (RoF). The communication system illustrated in FIG. 1 includes a digital processing unit 100, a remote radio unit 200, and an optical fiber cable 300 that is provided between the digital processing unit 100 and the remote radio unit 200.

The digital processing unit 100 includes a plurality of modulators 1-1 through 1-$n$, a plurality of oscillators 2-1 through 2-$n$, a combiner 3, and an E/O (Electrical to Optical) circuit 4. Transmission signals 1 through n are respectively input to the modulators 1-1 through 1-$n$. Each of the transmission signals 1 through n is indicated by an I (Inphase) component and a Q (Quadrature) component. In addition, oscillator signals IF1 through IFn generated by the oscillators 2-1 through 2-$n$ are respectively input to the modulators 1-1 through 1-$n$. The frequencies of the oscillator signals IF1 through IFn are different from each other. The oscillator signals IF1 through IFn are allocated in the intermediate frequency band in this example.

The modulators 1-1 through 1-$n$ respectively generate modulated signals 1 through n by modulating the oscillator signals IF1 through IFn with the transmission signals 1 through n. The combiner 3 combines the modulated signals 1 through n. The E/O circuit 4 converts the output signal of the combiner 3 into an optical signal. The E/O circuit 4 may be configured to include a laser element. The optical signal output from the E/O circuit 4 is transmitted through the optical fiber cable 300 to the remote radio unit 200. That is, the transmission signals 1 through n are transmitted to the remote radio unit 200 by Intermediate Frequency over Fiber (IFoF). IFoF is one of the aspects of RoF. Note that frequencies of carriers (that is, oscillator signals IF1 through IFn) of the transmission signals 1 through n are different from each other. Thus, the transmission signals 1 through n are transmitted to the remote radio unit 200 in Frequency Division multiplexing. The transmission signals 1 through n may be multiplexed in Frequency Division Duplex (FDD) mode.

The remote radio unit 200 includes an O/E (Optical to Electrical) circuit 11, a plurality of demodulators 12-1 through 12-$n$, a plurality of oscillators 13-1 through 13-$n$, a plurality of mixers 14-1 through 14-$n$, a plurality of amplifiers 15-1 through 15-$n$, and a plurality of antennas 16-1 through 16-$n$. The remote radio unit 200 receives the optical signal output from the digital processing unit 100 through the optical fiber cable 300.

The O/E circuit 11 converts the received optical signal into an electric signal. The electric signal includes the modulated signals 1 through n. The O/E circuit 11 may be configured to include a photodiode. The demodulators 12-1 through 12-$n$ respectively demodulate the modulated signals 1 through n included in the output signal of the O/E circuit 11 using oscillator signals IF1 through IFn generated by the oscillators 13-1 through 13-$n$. Note that frequencies of the oscillator signals IF1 through IFn generated by the oscillators 2-1 through 2-$n$ in the digital processing unit 100 are substantially the same with frequencies of the oscillator signals IF1 through IFn generated by the oscillators 13-1 through 13-$n$ in the remote radio unit 200, respectively. Thus, the transmission signals 1 through n in a baseband region are respectively recovered by the demodulators 12-1 through 12-$n$.

The mixers 14-1 through 14-$n$ respectively up-convert the recovered transmission signals 1 through n using an oscillator signal LO of a radio frequency to generate RF signals through n. Modulators may be provided between the demodulators 12-1 through 12-$n$ and the mixers 14-1 through 14-$n$. In this case, the mixers 14-1 through 14-$n$ respectively up-convert modulated signals using the oscillator signal LO to generate the RF signals 1 through n. As an example, the oscillator signal LO may be generated in the digital processing unit 100 and transmitted to the remote radio unit 200 through the optical fiber cable 300. The amplifiers 15-1 through 15-$n$ respectively amplify the RF signals 1 through n. In this example, each of the amplifiers 15-1 through 15-$n$ is a high-power amplifier (HPA). The antennas 16-1 through 16-$n$ respectively output the RF signals amplified by the amplifiers 15-1 through 15-$n$.

In the communication system described above, when the RF signals are amplified by the amplifiers 15-1 through 15-$n$, waveforms of the RF signals may be distorted. Thus, the remote radio unit 200 has a function to generate a feedback signal from the RF signals 1 through n amplified by the amplifiers 15-1 through 15-$n$ and to transmit the feedback signal to the digital processing unit 100. In addition, the digital processing unit 100 has a function (that is, predistortion function) to correct the transmission signals 1 through n based on the feedback signal.

The communication system according to the embodiments of the present invention may be applied to a MIMO system for example. Note that the antenna implemented in the remote radio unit 200 is not limited to a particular configuration and may be a honeycomb antenna and so on.

First Embodiment

FIG. 2 illustrates an example of a digital processing unit according to a first embodiment of the present invention. In this example, the digital processing unit 100 transmits transmission signals 1 and 2 to the remote radio unit 200. In addition, each of the transmission signals 1 and 2 is indicated by an I component and a Q component. Note that the number of transmission signals transmitted from the digital processing unit 100 to the remote radio unit 200 is not limited and three or more transmission signals may be transmitted.

The digital processing unit 100 includes, as illustrated in FIG. 2, predistorters 21-1 and 21-2, modulators 22-1 and 22-2, oscillators 23-1 and 23-2, a combiner 24, a D/A (Digital-to-Analog) converter 25, a band-pass filter (BPF) 26, an oscillator 27, a combiner 28, an E/O circuit 29, an O/E circuit 30, a mixer 31, an A/D (Analog-to-Digital) converter 32, and a controller 33. Note that the digital processing unit 100 may further include other circuit elements that are not illustrated in FIG. 2.

The predistorters 21-1 and 21-2 respectively add a distortion to waveforms of the transmission signals 1 and 2 according to a correction instruction given from the controller 33. The configuration and operations of a predistorter may be implemented by using conventional technique, and thus their explanation is omitted here. Note that an operation for adding a distortion to a transmission signal using a predistorter is an example of operation for correcting the transmission signal.

The modulator 22-1 generates a modulated signal 1 from the transmission signal 1 corrected by the predistorter 21-1 using an oscillator signal IF1 generated by the oscillator 23-1. In this example, the modulator 22-1 and the oscillator 23-1 generate the modulated signal 1 from the transmission signal 1 in the digital domain. In this case, the modulator 22-1 may generate the modulated signal 1 by multiplying the I component of the transmission signal 1 by "$\cos(2\pi f_1 t)$" and multiplying the Q component of the transmission signal 1 by "$-\sin(2\pi f_1 t)$". Here, $f_1$ represents a frequency of the oscillator signal IF1. Similarly, modulator 22-2 generates a modulated signal 2 from the transmission signal 2 corrected by the predistorter 21-2 using an oscillator signal IF2 generated by the oscillator 23-2. However, the frequencies of the oscillator signals IF1 and IF2 are different from each other. Note that the oscillator signals IF1 and IF2 are allocated in the intermediate frequency band in this example.

The combiner 24 combines the modulated signal 1 and the modulated signal 2. The D/A converter 25 converts the output signal of the combiner 24 into an analog signal. This analog signal indicates the modulated signal 1 and the modulated signal 2. Note that the D/A converter 25 is not necessary in a configuration in which the modulator 22-1 and 22-2 generate analog modulated signals. The band-pass filter 26 filters the output signal of the D/A converter 25. The band-pass filter 26 transmits the intermediate frequency band and rejects other frequency components. The digital processing unit 100 may be equipped with a low-pass filter in place of the band-pass filter 26.

The oscillator 27 generates an oscillator signal LO of the radio frequency. The combiner 28 combines the output signal of the band-pass filter 26 and the oscillator signal LO generated by the oscillator 27. That is, a signal that includes the modulated signal 1, the modulated signal 2, and the oscillator signal LO is generated. The E/O circuit 29 converts the output signal of the combiner 28 into an optical signal. The E/O circuit 29 may be configured to include a laser element. The optical signal output from the E/O circuit 29 is transmitted to the remote radio unit 200 through the optical fiber cable 300D.

FIG. 3 illustrates an example of a frequency allocation of an optical signal transmitted between the digital processing unit 100 and the remote radio unit 200. The optical signal transmitted from the digital processing unit 100 to the remote radio unit 200 carries the modulated signal 1, the modulated signal 2, and the oscillator signal LO. The transmission signals 1 and 2 are allocated in the intermediate frequency band. The oscillator signal LO is allocated in the radio frequency band. The feedback signal illustrated in FIG. 3 will be described later.

The carrier frequencies (IF1, IF2) of the modulated signals 1 and 2 are different from each other as illustrated in FIG. 3. Thus, the modulated signals 1 and 2 are transmitted to the remote radio unit 200 in Frequency Division Multiplexing (or FDD mode).

The O/E circuit 30, the mixer 31, the A/D converter 32, and the controller 33 illustrated in FIG. 2 processes an optical signal received through the optical fiber cable 300U from the remote radio unit 200. Therefore, the O/E circuit 30, the mixer 31, the A/D converter 32, and the controller 33 will be described later.

Figure 4:
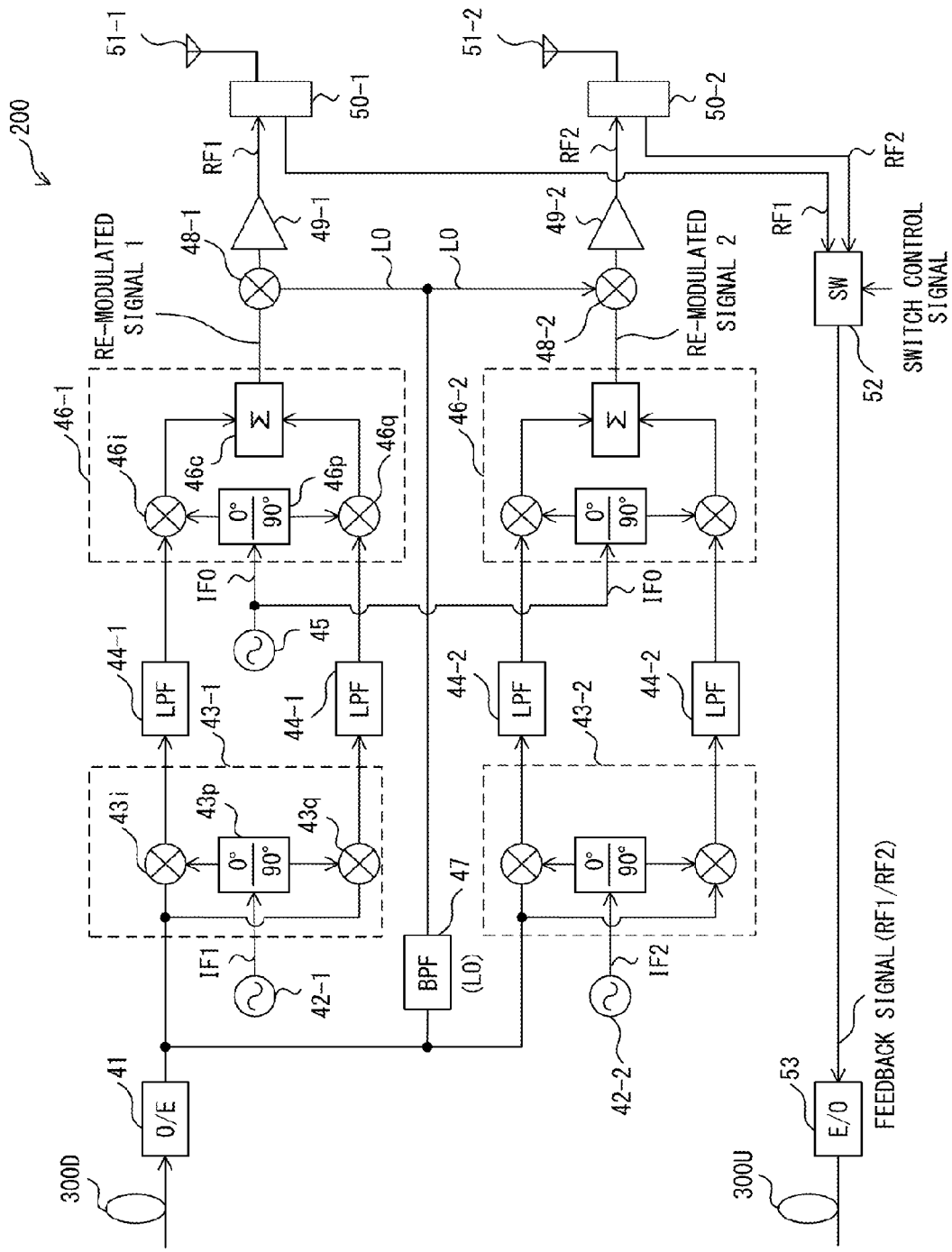
FIG. 4 illustrates an example of the remote radio unit according to the first embodiment.

FIG. 4 illustrates an example of a remote radio unit according to the first embodiment of the present invention. In this example, the remote radio unit 200 receives the optical signal transmitted from the digital processing unit 100 through the optical fiber cable 300D.

The remote radio unit 200 includes an O/E circuit 41, oscillators 42-1 and 42-2, demodulators 43-1 and 43-2, low-pass filters (LPF) 44-1 and 44-2, an oscillator 45, modulators 46-1 and 46-2, a band-pass filter (BPF) 47, mixers 48-1 and 48-2, amplifiers 49-1 and 49-2, dividers 50-1 and 50-2, antennas 51-1 and 51-2, a switch circuit 52, and an E/O circuit 53. Note that the remote radio unit 200 may further include other circuit elements that are not illustrated in FIG. 4.

The O/E circuit 41 converts the optical signal received from the digital processing unit 100 through the optical fiber cable 300D into an electric signal. This electric signal includes the oscillator signal LO, the modulated signal 1, and the modulated signal 2 illustrated in FIG. 3. The carrier frequency of the modulated signal 1 is IF1, and the carrier frequency of the modulated signal 2 is IF2, which is different from IF1. The O/E circuit 41 may be configured to include a photodiode.

The oscillator 42-1 generates an oscillator signal IF1. The frequency of the oscillator signal IF1 generated by the oscillator 42-1 is substantially the same as the oscillator signal generated by the oscillator 23-1 in the digital processing unit 100. That is, the frequency of the oscillator signal IF1 generated by the oscillator 42-1 is substantially the same as the carrier frequency of the modulated signal 1.

The demodulator 43-1 demodulates the modulated signal 1 using the oscillator signal IF1 generated by the oscillator 42-1. In this example, the demodulator 43-1 includes a phase circuit 43p, and mixers 43i and 43q. In this case, the phase circuit 43p generates a pair of oscillator signals from the oscillator signal IF1 generated by the oscillator 42-1. Phases of the pair of oscillator signals are different from each other by 90 degrees. The mixer 43i mixes the output signal of the O/E circuit 41 with one of the pair of the oscillator signals to recover the I component of the baseband transmission signal 1. Similarly, the mixer 43q mixes the output signal of the O/E circuit 41 with the other of the pair of the oscillator signals to recover the Q component of the baseband transmission signal 1.

The configuration and operations of the oscillator 42-2 and the demodulator 43-2 are substantially the same as those of the oscillator 42-1 and the demodulator 43-1. However, the frequency of the oscillator signal IF2 generated by the oscillator 42-1 is substantially the same as the carrier frequency of the modulated signal 2. Thus, the demodulator 43-2 recovers the I component and the Q component of the baseband transmission signal 2.

The low-pass filter 44-1 removes high-frequency components from the I component and the Q component of the baseband transmission signal 1 recovered by the demodulator 44-1. Similarly, the low-pass filter 44-2 removes high-frequency components from the I component and the Q component of the baseband transmission signal 2 recovered by the demodulator 44-2.

The oscillator 45 generates an oscillator signal IF0 of a specified intermediate frequency. It is preferable that the frequency of the oscillator signal IF0 be close to IF1 and IF2. For example, IF0 may be an average of IF1 and IF2.

The modulator 46-1 modulates the oscillator signal IF0 with the baseband transmission signal 1 recovered by the demodulator 43-1 to generate a re-modulated signal 1. In this example, the modulator 46-1 includes a phase circuit 46p, mixers 46i and 46q, and a combiner 46c. In this case, the phase circuit 46p generates a pair of oscillator signals from the oscillator signal IF0 generated by the oscillator 45. Phases of the pair of oscillator signals are different from each other by 90 degrees. The mixer 46i mixes the I component of the recovered baseband transmission signal 1 with one of the pair of the oscillator signals to generate the I component of the re-modulated signal 1. Similarly, the mixer 46q mixes the Q component of the recovered baseband transmission signal 1 with the other of the pair of the oscillator signals to generate the Q component of the re-modulated signal 1. The combiner 46c combines the I component and the Q component of the re-modulated signal 1 and outputs them. That is, the modulator 46-1 generates the re-modulated signal 1.

The configuration and operations of the modulator 46-2 are substantially the same as those of the modulator 46-1. However, the modulator 46-2 modulates the oscillator signal IF0 with the baseband transmission signal 2 recovered by the demodulator 43-2 to generate a re-modulated signal 2. Note that, in this example, the carrier frequencies of the re-modulated signals 1 and 2 are the same each other. That is, both of the carrier frequencies of the re-modulated signals 1 and 2 are IF0.

The band-pass filter 47 filters the output signal of the O/E circuit 41. The center frequency of a pass band of the band-pass filter 47 is substantially the same as the frequency of the oscillator signal LO. That is, the band-pass filter 47 extracts the oscillator signal LO from the received optical signal.

The mixer 48-1 mixes the re-modulated signal 1 generated by the modulator 46-1 with the oscillator signal LO extracted by the band-pass filter 47. Similarly, the mixer 48-2 mixes the re-modulated signal 2 generated by the modulator 46-2 with the oscillator signal LO extracted by the band-pass filter 47. As a result, the re-modulated signals 1 and 2 are up-converted to the radio frequency band. In the following description, the up-converted re-modulated signals 1 and 2 may be referred to as RF1 and Rf2, respectively. Note that, in this example, the carrier frequencies of the re-modulated signals RF1 and RF2 are the same each other. Specifically, both of the carrier frequencies of the re-modulated signals RF1 and RF2 are LO+IF0. LO indicates an oscillating frequency of the oscillator 27 in the digital processing unit 100. IF0 indicates an oscillating frequency of the oscillator 45.

The amplifier 49-1 amplifies the re-modulated signal RF1. The divider 50-1 divides the re-modulated signal RF1 amplified by the amplifier 49-1 and guides the re-modulated signals RF1 to the antenna 51-1 and the switch circuit 52.

Thus, the re-modulated signal RF1 is output via the antenna 51-1. Similarly, the amplifier 49-2 amplifies the re-modulated signal RF2. The divider 50-2 divides the re-modulated signal RF2 amplified by the amplifier 49-2 and guides the re-modulated signals RF2 to the antenna 51-2 and the switch circuit 52. Thus, the re-modulated signal RF2 is output via the antenna 51-2. Note that, in this example, each of the amplifiers 49-1 and 49-2 may be a high-power amplifier. Each of the dividers 50-1 and 50-2 may be implemented by a directional coupler.

The switch circuit 52 alternately selects the re-modulated signal RF1 output from the amplifier 49-1 or the re-modulated signal RF2 output from the amplifier 49-2 according to a switch control signal. As a result, a feedback signal in which the re-modulated signal RF1 and the re-modulated signal RF2 are time-division multiplexed is generated. The carrier frequencies of the re-modulated signal RF1 and the re-modulated signal RF2 are the same each other, as illustrated in FIG. 3. However, the re-modulated signal RF1 and the re-modulated signal RF2 are allocated in different time slots. Note that the switch control signal may be generated by the controller 33 in the digital processing unit 100.

The E/O circuit 53 converts the feedback signal output from the switch circuit 52 into an optical signal. The E/O circuit 53 may be configured to include a laser element. The optical signal generated by the E/O circuit 53 is transmitted to the digital processing unit 100 through the optical fiber cable 300U. This optical signal carries the re-modulated signal RF1 and the re-modulated signal RF2 multiplexed in Time Division Multiplexing. The re-modulated signal RF1 and the re-modulated signal RF2 may be multiplexed in TDD (Time Division Duplex) mode.

The optical signal generated by the E/O circuit 53 in the remote radio unit 200 is transmitted through the optical fiber cable 300U and converted into an electric signal by the O/E circuit 30 in the digital processing unit 100 illustrated in FIG. 2. The O/E circuit 30 may be configured to include a photodiode.

The mixer 31 mixes the output signal (that is, the feedback signal generated by the remote radio unit 200) of the O/E circuit 30 with the oscillator signal LO generated by the oscillator 27. The re-modulated signal RF1 and the re-modulated signal RF2 multiplexed in the feedback signal have been up-converted to the radio frequency band by using the oscillator signal LO in the remote radio unit 200. Thus, when the received feedback signal is down-converted by using the oscillator signal LO, the re-modulated signals 1 and 2 of the intermediate frequency are recovered. Accordingly, since the same oscillator signal LO is used in up-converting in the remote radio unit 200 and in down-converting in the digital processing unit 100, the digital processing unit 100 can recover the re-modulated signals 1 and 2 without frequency offset.

The A/D converter 32 converts the output signal of the mixer 31 into a digital signal. This digital signal indicates the feedback signal in which down-converted re-modulated signals 1 and 2 are multiplexed.

The controller 33 generates the switch control signal. The switch control signal indicates, for example, an instruction to alternately select the re-modulated signal RF1 or the re-modulated signal RF2 at a specified cycle. The switch control signal is transmitted to the remote radio unit 200 and given to the switch circuit 52. The transmission of the switch control signal from the digital processing unit 100 to the remote radio unit 200 may be realized by any preferable scheme. For example, the switch control signal may be superimposed on the transmission signal 1 or 2 and transmitted to the remote radio unit 200. In this case, the remote radio unit 200 is equipped with a detection circuit that detects the switch control signal superimposed on the transmission signal 1 or 2 and gives the detected switch control signal to the switch circuit 52.

The controller 33 generates correction instructions to be given to the predistorter 21-1 and 21-2 based on the feedback signal. For example, when the switch control signal indicates the re-modulated signal RF1, the controller 33 receives the re-modulated signal 1 that has been down-converted to the intermediate frequency as the feedback signal. In this case, the controller 33 generates the correction instruction for controlling a waveform of the feedback signal to be a preferable state and gives it to the predistorter 21-1. By doing this, the distortion of the re-modulated signal RF1 output from the amplifier 49-1 in the remote radio unit 200 is compensated for or suppressed. When the switch control signal indicates the re-modulated signal RF2, the controller 33 receives the re-modulated signal 2 that has been down-converted to the intermediate frequency as the feedback signal. In this case, the controller 33 generates the correction instruction for controlling a waveform of the feedback signal to be a preferable state and gives it to the predistorter 21-2. By doing this, the distortion of the re-modulated signal RF2 output from the amplifier 49-2 in the remote radio unit 200 is compensated for or suppressed. Note that the controller 33 may generate the correction instruction after converting the feedback signal of the intermediate frequency into a baseband signal.

As described, according to the first embodiment, a plurality of radio frequency signals (the re-modulated signals RF1 and RF2 in the example) generated in the remote radio unit 200 are multiplexed in Time Division Multiplexing (or TDD mode) and transmitted to the digital processing unit 100. That is, the feedback signal can be transmitted from the remote radio unit 200 to the digital processing unit 100 through one optical fiber cable. Therefore, it is not necessary to provide a plurality of optical fiber cables for transmitting the feedback signal even in a configuration in which the remote radio unit 200 is equipped with a plurality of antennas.

In addition, the oscillator signal LO together with the transmission signals are transmitted from the digital processing unit 100 to the remote radio unit 200 in Radio over Fiber, and the remote radio unit 200 respectively up-converts the transmission signals to the radio frequency band using the oscillator signal LO to generate a plurality of radio frequency signals. In addition, the remote radio unit 200 transmits a feedback signal in which the plurality of radio frequency signals are multiplexed to the digital processing unit 100. Then the digital processing unit 100 down-converts the feedback signal using the same oscillator signal LO and corrects the transmission signals based on the down-converted feedback signal. Therefore, the digital processing unit 100 can precisely down-convert the output signal of the amplifier provided in the remote radio unit 200 without frequency offset. As a result, a distortion of the output signal of the amplifier provided in the remote radio unit 200 may be sufficiently compensated for or suppressed.

Note that in the example illustrated in FIG. 2 and FIG. 4, there is an optical fiber cable 300U for transmitting the feedback signal between the digital processing unit 100 and the remote radio unit 200; however, the present invention is not limited to this configuration. That is, the communication system according to the first embodiment does not need to include an optical fiber cable dedicated to transmitting the feedback signal.

Figure 5:
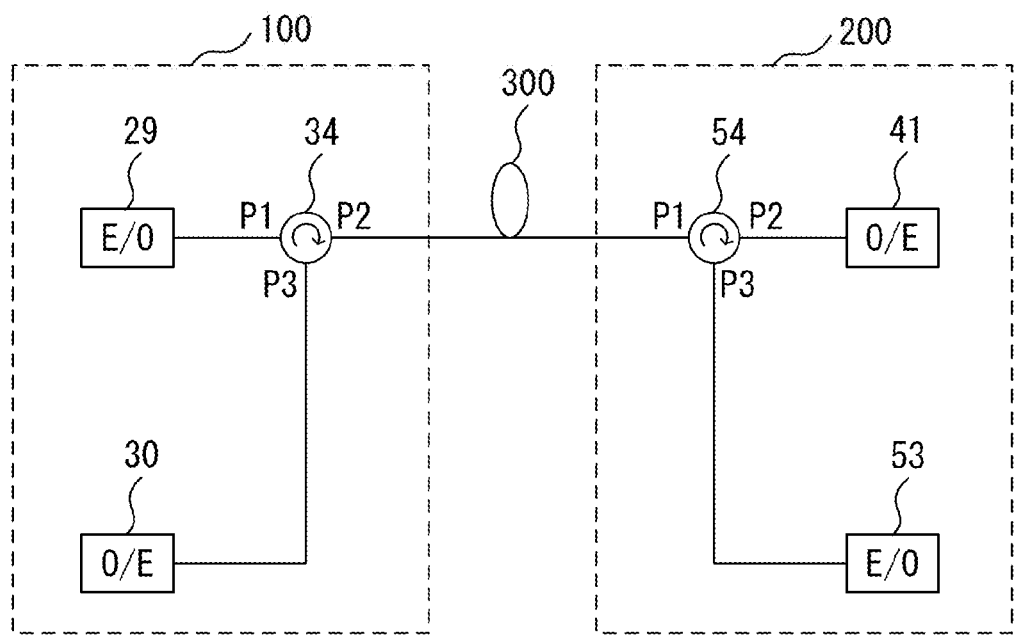
FIG. 5 illustrates an example of a configuration in which an optical fiber is shared by a downlink and an uplink.

FIG. 5 illustrates an example of a configuration in which an optical fiber is shared by a downlink and an uplink. The downlink transmits a signal from the digital processing unit 100 to the remote radio unit 200. The uplink transmits a signal from the remote radio unit 200 to the digital processing unit 100.

An optical fiber cable 300 is provided between the digital processing unit 100 and the remote radio unit 200. The digital processing unit 100 is equipped with an optical circulator 34 in addition to the configuration illustrated in FIG. 2. The optical circulator 34 guides an optical signal input via a port P1 to a port P2, guides an optical signal input via the port P2 to a port P3, and guides an optical signal input via the port P3 to the port P1. Similarly, the remote radio unit 200 is equipped with an optical circulator 54 in addition to the configuration illustrated in FIG. 4. The optical circulator 54 also guides an optical signal input via a port P1 to a port P2, guides an optical signal input via the port P2 to a port P3, and guides an optical signal input via the port P3 to the port P1.

The optical signal generated in the digital processing unit 100 is input to the port P1 of the optical circulator 34. Thus, the optical signal is output via the port P2 of the optical circulator 34 and transmitted to the remote radio unit 200 through the optical fiber cable 300. Then the optical signal is input to the port P1 of the optical circulator 54, and is thus guided to the O/E circuit 41 via the port P2.

The feedback signal generated in the remote radio unit 200 is input to the port P3 of the optical circulator 54. Thus, the feedback signal is output via the port P1 of the optical circulator 54 and transmitted to the digital processing unit 100 through the optical fiber cable 300. Then the feedback signal is input to the port P2 of the optical circulator 34, and is thus guided to the O/E circuit 30 via the port P3.

As described, in the configuration illustrated in FIG. 5, the downlink signal and the uplink signal are transmitted through one optical fiber cable. Accordingly, the number of optical fibers provided between the digital processing unit 100 and the remote radio unit 200 can be further reduced.

Second Embodiment

In the first embodiment, a plurality of signals amplified by a plurality of amplifiers in the remote radio unit are multiplexed in Time Division Multiplexing and transmitted to the digital processing unit. In the second embodiment, the plurality of signals amplified in the remote radio unit are multiplexed in Frequency Division Multiplexing and transmitted to the digital processing unit. The plurality of signals amplified in the remote radio unit may be multiplexed in FDD mode.

Figure 6:
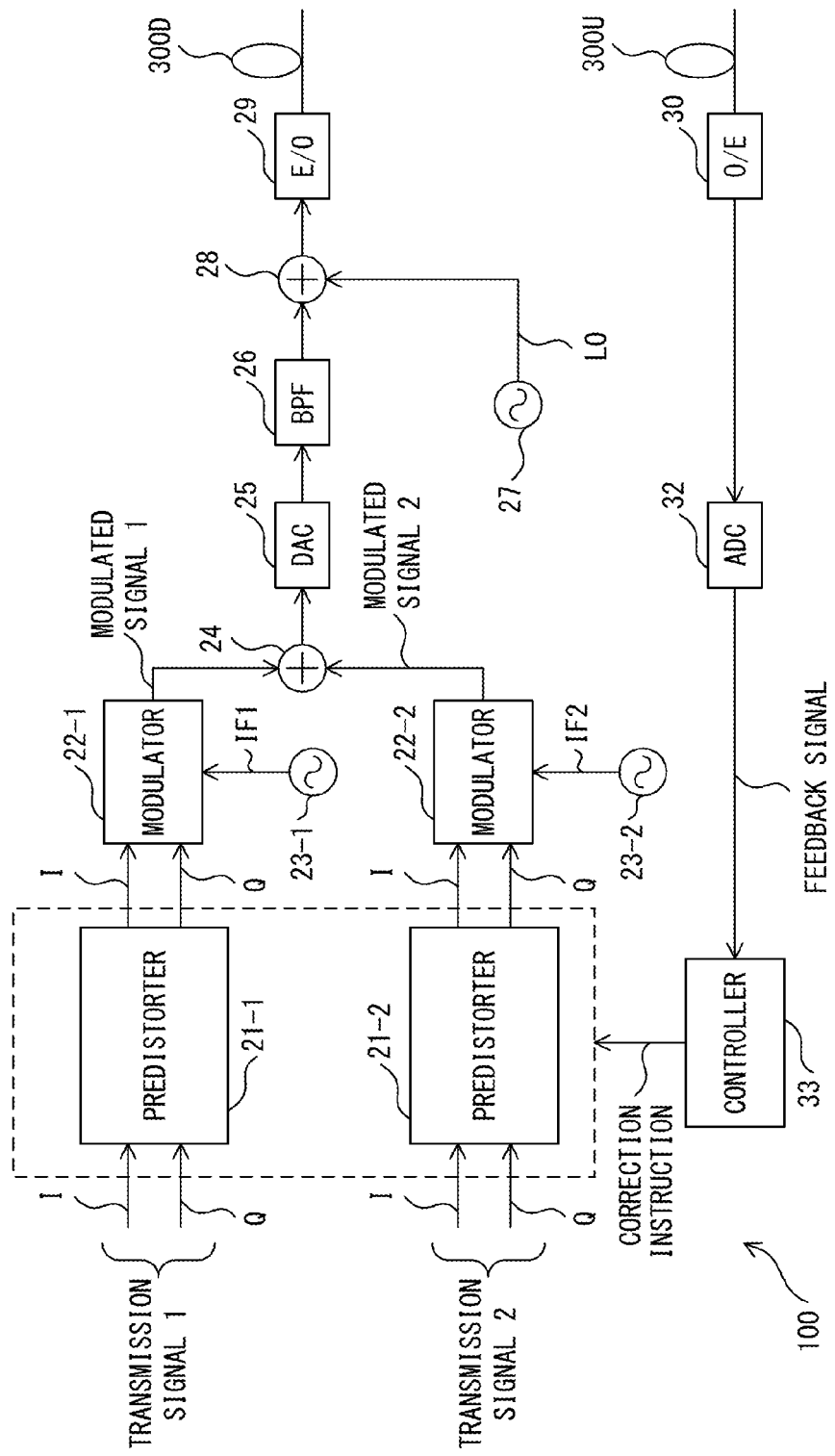
FIG. 6 illustrates an example of the digital processing unit according to a second embodiment.

FIG. 6 illustrates an example of the digital processing unit according to the second embodiment. FIG. 7 illustrates an example of the remote radio unit according to the second embodiment.

The configuration and operations to generate the optical signal in the digital processing unit 100 are substantially the same in the first and second embodiments. That is, the digital processing unit 100 generates an optical signal that includes the modulated signal 1, the modulated signal 2, and the oscillator signal LO illustrated in FIG. 3 and transmits the optical signal to the remote radio unit 200 in Radio over Fiber (RoF).

The configuration and operations to generate the re-modulated signals RF1 and RF2 from the received optical signal in the remote radio unit 200 are similar to each other in the first and second embodiments. However, in the example illustrated in FIG. 7, direct conversion is performed on the baseband signals recovered by the demodulators 43-1 and 43-2. That is, the modulator 46-1 modulates the oscillator signal LO with the baseband transmission signal 1 recovered by the demodulator 43-1 to generate the re-modulated signal RF1. Similarly, the modulator 46-2 modulates the oscillator signal LO with the baseband transmission signal 2 recovered by the demodulator 43-2 to generate the re-modulated signal RF2.

Note that, similarly to the first embodiment, the baseband signal may be converted to a radio frequency signal via the intermediate frequency also in the second embodiment. In addition, the baseband signal may be converted to the radio frequency signal by direct conversion also in the first embodiment.

The circuit to generate the feedback signal in the second embodiment is equipped with oscillators 61-1 and 61-2, mixers 62-1 and 62-2, band-pass filters 63-1 and 63-2, and a combiner 64 as illustrated in FIG. 7.

The oscillator 61-1 generates an oscillator signal LO_FB1. A frequency of the oscillator signal LO_FB1 is shifted by IF3 with respect to the oscillator signal LO generated in the digital processing unit 100. IF3 is the intermediate frequency. The mixer 62-1 mixes the re-modulated signal RF1 output from the amplifier 49-1 with the oscillator signal LO_FB1. That is, the re-modulated signal RF1 is down-converted using the oscillator signal LO_FB1. Here, the carrier frequency of the re-modulated signal RF1 is LO. Thus, the frequency of the re-modulated signal 1 output from the mixer 62-1 is IF3.

Similarly, the oscillator 61-2 generates an oscillator signal LO_FB2. A frequency of the oscillator signal LO_FB2 is shifted by IF4 with respect to the oscillator signal LO generated in the digital processing unit 100. IF4 is the intermediate frequency that is different from IF3. The mixer 62-2 mixes the re-modulated signal RF2 output from the amplifier 49-2 with the oscillator signal LO_FB2. That is, the re-modulated signal RF2 is down-converted using the oscillator signal LO_FB2. Here, the carrier frequency of the re-modulated signal RF1 is also LO. Thus, the frequency of the re-modulated signal 2 output from the mixer 62-2 is IF4.

The center frequencies of the pass bands of the band-pass filters 63-1 and 63-2 are IF3 and IF4, respectively. The band-pass filters 63-1 and 63-2 respectively filter the output signals of the mixers 62-1 and 62-2. The combiner 64 combines the filtered re-modulated signals 1 and 2 to generate a feedback signal. That is, in the second embodiment, the feedback signal in which the re-modulated signals 1 and 2 of the intermediate frequency are multiplexed in Frequency Division Multiplexing is generated.

The E/O circuit 53 converts the feedback signal into an optical signal. Thus, the feedback signal in which the re-modulated signals 1 and 2 are multiplexed in Frequency Division Multiplexing is transmitted to the digital processing unit 100 in RoF.

The digital processing unit 100 corrects the transmission signals 1 and 2 based on the feedback signal included in the received optical signal. Specifically, the digital processing unit 100 extracts the re-modulated signals 1 and 2 from the feedback signal and corrects the transmission signals 1 and 2 respectively based on the re-modulated signals 1 and 2. Note that the digital processing unit 100 may convert the re-modulated signals 1 and 2 of the intermediate frequency into baseband signals in the analog domain. Alternately, the digital processing unit 100 may convert the re-modulated signals 1 and 2 of the intermediate frequency into baseband signals in the digital domain.

As described, in the second embodiment, a plurality of signals generated in the remote radio unit 200 are multiplexed in Frequency Division Multiplexing and transmitted to the digital processing unit 100. Therefore, also in the second embodiment, it is not necessary to provide a plurality of optical fiber cables for transmitting the feedback signal even in a configuration in which the remote radio unit 200 is equipped with a plurality of antennas.

According to the embodiments, in a communication system in which a plurality of signals are transmitted from a signal processing device to a remote radio device, states of signals amplified in the remote radio device can be efficiently reported to the signal processing device.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A communication device comprising:
   a converter circuit configured to convert an optical signal that carries an oscillator signal of a radio frequency and a plurality of transmission signals of different intermediate frequencies generated in a signal processing device into an electric signal, the intermediate frequencies being different from the radio frequency and the oscillator signal being not used to generate the plurality of transmission signals;
   an extractor configured to extract the oscillator signal from the electric signal;
   a recovery circuit configured to recover the plurality of transmission signals from the electric signal;
   a radio frequency signal generator configured to generate a plurality of radio frequency signals that respectively carry the plurality of transmission signals recovered by the recovery circuit using the oscillator signal extracted by the extractor;
   a plurality of amplifiers respectively configured to amplify the plurality of radio frequency signals;
   a plurality of antennas respectively configured to output the plurality of radio frequency signals amplified by the plurality of amplifiers;
   a feedback circuit configured to generate a feedback signal from the plurality of radio frequency signals amplified by the plurality of amplifiers; and
   a transmitter configured to convert the feedback signal into an optical signal and transmit the optical signal to the signal processing device.

2. The communication device according to claim 1, wherein
   the feedback circuit multiplexes the plurality of radio frequency signals amplified by the plurality of amplifiers in time division multiplexing to generate the feedback signal.

3. The communication device according to claim 1, wherein
   the feedback circuit multiplexes the plurality of radio frequency signals amplified by the plurality of amplifiers in frequency division multiplexing to generate the feedback signal.

4. The communication device according to claim 1, further comprising
   an oscillator configured to generate an intermediate frequency oscillator signal, wherein
   the radio frequency signal generator modulates the intermediate frequency oscillator signal respectively with the plurality of transmission signals recovered by the recovery circuit to generate a plurality of re-modulated signals, and respectively up-converts the plurality of re-modulated signals using the oscillator signal extracted by the extractor to generate the plurality of radio frequency signals.

5. The communication device according to claim 1, wherein
   the radio frequency signal generator modulates the oscillator signal extracted by the extractor respectively with the plurality of transmission signals recovered by the recovery circuit to generate the plurality of radio frequency signals.

6. A communication system that includes a signal processing device and a remote radio device, wherein
   the signal processing device includes:
      an oscillator configured to generate an oscillator signal of a radio frequency;
      a modulated signal generator configured to generate a plurality of modulated signals of different intermediate frequencies from a plurality of transmission signals, the intermediate frequencies being different from the radio frequency and the oscillator signal being not used to generate the plurality of modulated signals;
      an optical signal generator configured to generate an optical signal that carries the plurality of modulated signals and the oscillator signal;
      a down-convert circuit configured to down-convert a feedback signal received from the remote radio device using the oscillator signal; and
      a correction circuit configured to correct the plurality of transmission signals based on the feedback signal down-converted by the down-convert circuit, and wherein
   the remote radio device includes:
      a converter circuit configured to convert the optical signal into an electric signal;
      an extractor configured to extract the oscillator signal from the electric signal;
      a recovery circuit configured to recover the plurality of transmission signals from the electric signal;
      a radio frequency signal generator configured to generate a plurality of radio frequency signals that respectively carry the plurality of transmission signals recovered by the recovery circuit using the oscillator signal extracted by the extractor;
      a plurality of amplifiers respectively configured to amplify the plurality of radio frequency signals;
      a plurality of antennas respectively configured to output the plurality of radio frequency signals amplified by the plurality of amplifiers; and
      a feedback circuit configured to generate the feedback signal from the plurality of radio frequency signals amplified by the plurality of amplifiers.

7. The communication system according to claim 6, wherein
   the feedback circuit multiplexes the plurality of radio frequency signals amplified by the plurality of amplifiers in time division multiplexing to generate the feedback signal.

8. The communication system according to claim 6, wherein
   the feedback circuit multiplexes the plurality of radio frequency signals amplified by the plurality of amplifiers in frequency division multiplexing to generate the feedback signal.

9. The communication system according to claim 6, wherein
   the remote radio device further includes an intermediate frequency oscillator configured to generate an intermediate frequency oscillator signal, and wherein
   the radio frequency signal generator modulates the intermediate frequency oscillator signal respectively with the plurality of transmission signals recovered by the recovery circuit to generate a plurality of re-modulated signals, and respectively up-converts the plurality of re-modulated signals using the oscillator signal extracted by the extractor to generate the plurality of radio frequency signals.

10. The communication system according to claim 6, wherein
   the radio frequency signal generator modulates the oscillator signal extracted by the extractor respectively with the plurality of transmission signals recovered by the recovery circuit to generate the plurality of radio frequency signals.

11. The communication system according to claim 6, wherein
   the correction circuit corrects the plurality of transmission signals based on the feedback signal down-converted by the down-convert circuit so as to suppress waveform distortions of the plurality of radio frequency signals amplified by the plurality of amplifiers.

* * * * *